United States Patent [19]
Mennemeier

[11] Patent Number: 5,831,885
[45] Date of Patent: Nov. 3, 1998

[54] COMPUTER IMPLEMENTED METHOD FOR PERFORMING DIVISION EMULATION

[75] Inventor: Larry M. Mennemeier, Boulder Creek, Calif.

[73] Assignee: Intel Corporation, Santa Clara, Calif.

[21] Appl. No.: 610,701

[22] Filed: Mar. 4, 1996

[51] Int. Cl.$^6$ ............................................. G06F 7/52
[52] U.S. Cl. ......................................................... 364/761
[58] Field of Search .................................. 364/761–764, 364/766

[56] References Cited

U.S. PATENT DOCUMENTS

| | | | |
|---|---|---|---|
| 3,202,805 | 8/1965 | Amdahl et al. ........................... | 235/164 |
| 3,711,692 | 1/1973 | Batcher ................................... | 235/175 |
| 3,723,715 | 3/1973 | Chen et al. .............................. | 235/175 |
| 4,161,784 | 7/1979 | Cushing et al. ......................... | 364/748 |
| 4,344,151 | 8/1982 | White ...................................... | 364/754 |
| 4,393,468 | 7/1983 | New ........................................ | 364/736 |
| 4,418,383 | 11/1983 | Doyle et al. ............................. | 364/200 |
| 4,498,177 | 2/1985 | Larson ...................................... | 371/52 |
| 4,707,800 | 11/1987 | Montrone et al. ....................... | 364/788 |
| 4,771,379 | 9/1988 | Ando et al. .............................. | 364/200 |
| 4,989,168 | 1/1991 | Kuroda et al. ...................... | 364/715.09 |
| 5,095,457 | 3/1992 | Jeong ...................................... | 364/758 |
| 5,111,422 | 5/1992 | Ullrich .................................... | 364/750 |
| 5,187,679 | 2/1993 | Vassiliadis et al. ..................... | 364/786 |
| 5,222,037 | 6/1993 | Taniquchi ................................ | 364/748 |
| 5,227,994 | 7/1993 | Mitsuharu ............................... | 364/750 |
| 5,241,492 | 8/1993 | Girardeau, Jr. ......................... | 364/736 |
| 5,262,976 | 11/1993 | Young et al. ............................ | 364/760 |
| 5,293,588 | 3/1994 | Narita et al. ............................ | 364/752 |
| 5,321,644 | 6/1994 | Schibinger ............................. | 364/737 |
| 5,325,320 | 6/1994 | Chiu ........................................ | 364/760 |
| 5,420,815 | 5/1995 | Nix et al. ................................. | 364/750 |
| 5,442,799 | 8/1995 | Murakami ............................... | 395/800 |
| 5,457,805 | 10/1995 | Nakamura ............................... | 395/800 |
| 5,487,022 | 1/1996 | Simpson et al. ........................ | 364/715 |
| 5,506,865 | 4/1996 | Weaver ................................... | 375/205 |
| 5,509,129 | 4/1996 | Guttag et al. ............................ | 395/375 |
| 5,517,438 | 5/1996 | Dao-Trong et al. ..................... | 364/748 |
| 5,528,529 | 6/1996 | Seal ......................................... | 364/736 |
| 5,576,983 | 11/1996 | Shiokawa ................................ | 364/754 |
| 5,644,524 | 7/1997 | Van Aken et al. ...................... | 364/766 |

OTHER PUBLICATIONS

J. Shipnes, *Graphics Processing with the 88110 RISC Microprocessor*, IEEE (1992), pp. 169–174.
*MC88110 Second Generation RISC Microprocessor User's Manual*, Motorola, Inc. (1991).
*Errata to MC88110 Second Generation RISC Microprocessor User's Manual*, Motorola Inc. (1992), pp. 1–11.
*MC88110 Programmer's Reference Guide*, Motorola Inc. (1992), pp. 1–4.
*i860 ™ Microprocessor Family Programmer's Reference Manual*, Intel Corporation (1992), Ch. 1, 3, 8, 12.
R.B. Lee, *Accelerating Multimedia With Enhanced Microprocessors*, IEEE Micro (Apr. 1995), pp. 22–32.

(List continued on next page.)

*Primary Examiner*—Tan V. Mai
*Attorney, Agent, or Firm*—Blakely, Sokoloff, Taylor & Zafman

[57] ABSTRACT

A computer implemented method for generating a quotient. The method is exclusive of division operations. The method includes a first step of generating, in response to a first instruction, a first delta by performing an operation between a denominator and a first value. A second step of generating, in response to a second instruction, a second delta by performing an operation between the denominator and the first delta. A third step of generating, in response to the second instruction, a third delta by performing an operation between the second delta and the denominator. A fourth step of joining, in response to a fourth instruction, the third delta to the first delta. Repeating the first through fourth steps until the first delta is equal to a predetermined value. Generating the quotient, in response to a fifth instruction, by performing an operation between the first delta and a numerator.

25 Claims, 16 Drawing Sheets

OTHER PUBLICATIONS

*TMS320C2x User's Guide*, Texas Instruments (1993) pp. 3–2 through 3–11; 3–28 through 3–34; 4–1 through 4–22; 4–41; 4–103; 4–199 through 4–120; 4–122; 4–150 through 4–151.

L. Gwennap, *New PA–RISC Processor Decodes MPEG Video*, Microprocessor Report (Jan. 1994), pp. 16, 17.

SPARC Technology Business, *UltraSPARC Multimedia Capabilities On–Chip Support for Real–Time Video and Advanced Graphics*, Sun Microsystems (Sep. 1994).

Y. Kawakami et al., *LSI Applications: A Single–Chip Digital Signal Processor for Voiceband Applications*, Solid State Circuits Conference, Digest of Technical Papers; IEEE International (1980).

B. Case, *Philips Hopes to Displace DSPs with VLIW*, Microprocessor Report (Dec. 1994), pp. 12–15.

L. Gwennap, *UltraSparc Adds Multimedia Instructions*, Microprocessor Report (Dec. 1994), pp. 16–18.

N. Margulis, *i860 Microprocessor Architecture*, McGraw Hill, Inc. (1990) Ch. 6, 7, 8, 10, 11.

*Pentium Processor User's Manual, vol. 3: Architecture and Programming Manual*, Intel Corporation (1993), Ch. 1, 3, 4, 6, 8, and 18.

| 63 | 56 55 | 48 47 | 40 39 | 32 31 | 24 23 | 16 15 | 8 7 | 0 |
|---|---|---|---|---|---|---|---|---|
| bbbb | bbbb | bbbb | bbbb | bbbb | bbbb | bbbb | bbbb | bbbb |

Unsigned Packed Byte In-register Representation 310

| 63 | 56 55 | 48 47 | 40 39 | 32 31 | 24 23 | 16 15 | 8 7 | 0 |
|---|---|---|---|---|---|---|---|---|
| sbbb | bbbb | sbbb | bbbb | sbbb | bbbb | sbbb | bbbb | sbbb bbbb |

Signed Packed Byte In-register Representation 311

Fig. 3a

| 63 | 48 47 | 32 31 | 16 15 | 0 |
|---|---|---|---|---|
| wwww wwww | wwww wwww | wwww wwww | wwww wwww |

Unsigned Packed Word In-register Representation 312

| 63 | 48 47 | 32 31 | 16 15 | 0 |
|---|---|---|---|---|
| swww wwww | swww wwww | swww wwww | swww wwww |

Signed Packed Word In-register Representation 313

Fig. 3b

| 63 | 32 31 | 0 |
|---|---|---|
| dddd dddd dddd dddd dddd dddd dddd dddd | dddd dddd dddd dddd dddd dddd dddd dddd |

Unsigned Packed Doubleword In-register Representation 314

| 63 | 32 31 | 0 |
|---|---|---|
| sddd dddd dddd dddd dddd dddd dddd dddd | sddd dddd dddd dddd dddd dddd dddd dddd |

Signed Packed Doubleword In-register Representation 315

Fig. 3c

COMPUTER IMPLEMENTED METHOD FOR PERFORMING DIVISION EMULATION

BACKGROUND OF THE INVENTION

1. Field of the Invention

The invention relates to computers and more specifically to the processing of pixel data values.

2. Description of Related Art

Images displayed on computer monitors are generated by joining many miniature picture elements commonly referred to as pixels. The pixels are represented in a variety of formats typically based on a combination of red, green, and blue values. The pixels representing an image are stored in an array under X & Y coordinates used to indicate placement of the pixels when generating the image.

Some pixels undergo texture mapping, which is a powerful technique used to add visual detail to synthetic images in computer graphics. Texture mapping serves to create the appearance of complexity by simply applying image detail onto a surface, in much the same way as wall paper. Textures are typically used to perturb surface normals, thus allowing the simulation of bumps and wrinkles without the tedium of modeling them geometrically.

In some cases, texture mapping is accounted for by adjusting the relative position of pixels when reproducing the image. In sum, the positions of the pixels are manipulated by dividing the respective X & Y coordinates of the pixels by a factor accounting for the modified projection of the image having undergone texture mapping. For example, if a pixel is originally represented at position 300, 500, the pixel position may be divided by a correction factor of 20 to generate the new positions of the 150, 250 as reflected in the modified projection.

The pixels are frequently used in on-line real time video applications, which are very performance-sensitive. Any slowdown in the application could result in slower video playback, less stunning graphics in video games, or some other related detraction from a visual experience. As such, there exist a continuous need to increase the speed of generating the images, including the implementation of the texture mapping, in order to increase the performance of video and related applications.

Divide instructions, however, are processed very slowly. The division operation is complex and requires a significant amount of die area. Considering divide operations are less common than other instructions, most general processors sacrifice an efficient and fast division circuit in favor of providing more efficient circuits for more common instructions (e.g. binary multiplication).

In order to increase the performance of generating the texture mapping in image applications, a division emulation sequence can be used to replace the division instruction by using a series of binomial multiplications instructions. Recall that (numerator (N)/denominator (D))*(X/X)=(N/D), and if (D)*(X)=1 then (N)*(X)=quotient (Q)=(N/D).

Moreover, assume that the products generated by 16-bit integers will be stored in 16-bit fields, with the most significant bit (MSB) representing a sign bit and the remaining bits representing a fraction. Under this assumption, the 16-bit field can represent approximately 0.9999695 through −1.0, where 0x8000 represents −1.0. Therefore, a multiplication sequence can be used to generate a quotient by first accumulating a reciprocal $R_i=(r_0*r_1*r_2 \ldots r_i)$ until the sequence generates $(r_0*r_1*r_2 \ldots r_i)* D=0\times8000=-1.0$, which can then be used to generate $(r_0*r_1*r_2 \ldots r_i)* N=-Q$.

A first step in generating the quotient, under this sequence, includes normalizing the denominator ($d_0$). Specifically, the denominator needs to be left justified to the 15th bit in a 16 bit field, leaving the MSB as a sign bit. This procedure is simply done by multiplying the denominator by $2^n$, wherein n represents the number of bit positions originally between the MSB of the denominator and the 15th bit position.

As a result, after the normalization process, $d_0$ represents $1.0 > d_0 \geq 0.5$. $d_0 = (1.0 - \Delta)$ where $\Delta \leq = (\frac{1}{2})$. $r_0$ can be picked so that $-r_0 = (-1.0 - \Delta)$, and $d_1 = d_0 * r_0 = (1.0 - \Delta) * (1.0 + \Delta) = (1.0 - \Delta^2)$. By picking $-r_i = (1.0 - \Delta^{2^i})$, gives $d_i = (1.0 - \Delta^{2^i})$ where $\Delta^{2^i} \leq (\frac{1}{2})^{2^i}$. Trial show the sequence can be completed in 4 loops, thereby generating the results $1.0 > d_4 \geq (1.0 - \frac{1}{2}^{16}) \approx 1.0$.

The results $(r_0*r_1*r_2*r_3*r_4)$ can in turn be multiplied with the numerator to generate Q, which can then be denormalized with respect to the denominator. Notice that $d_0 = (1.0 - \Delta)$ and $d_0*(r_0*r_1*r_2*r_3* r_4) = (1.0 - \Delta^{32})$. $d_4/d_0 = (1.0 - \Delta^{16})/(1.0 - \Delta) = 1.0 + \Delta + \Delta^2 + \Delta^{3+} \ldots + \Delta^{15}$. The Δ's are typically small and can be accurately represented by 16-bit numbers. As such, recent advancements in computer architecture can be used to process the division emulation sequence more efficiently. The advancements include the ability to process multiple small integer data values in parallel in response to a single instruction, otherwise referred to as a Single Instruction Multiple Data, hereinafter referred to as an SIMD. The multiple data elements are joined together as packed data sequences. The packed data sequences provide a single data structure storing of up to sixty-four-bits of integer data in one register, wherein the sequence includes multiple data elements of equal size.

Therefore, there exists need for an accelerated method of performing perspective texture mapping using division emulation through a binomial multiplication sequence using 64-bit packed data sequences and related SIMD instructions.

SUMMARY OF THE INVENTION

A computer implemented method for generating a quotient. The method is exclusive of division operations. The method includes a first step of generating, in response to a first instruction, a first delta by performing an operation between a denominator and a first value. A second step of generating, in response to a second instruction, a second delta by performing an operation between the denominator and the first delta. A third step of generating, in response to the second instruction, a third delta by performing an operation between the second delta and the denominator. A fourth step of joining, in response to a fourth instruction, the third delta to the first delta. Repeating the first through fourth steps until the first delta is equal to a predetermined value. Generating the quotient, in response to a fifth instruction, by performing an operation between the first delta and a numerator.

BRIEF DESCRIPTION OF THE DRAWINGS

FIG. 3*a* illustrates in-register packed byte representations according to one embodiment of the invention.

FIG. 3*b* illustrates in-register packed word representations according to one embodiment of the invention.

FIG. 3*c* illustrates in-register packed double word representations according to one embodiment of the invention.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Computer System of the Invention

Figure 1:
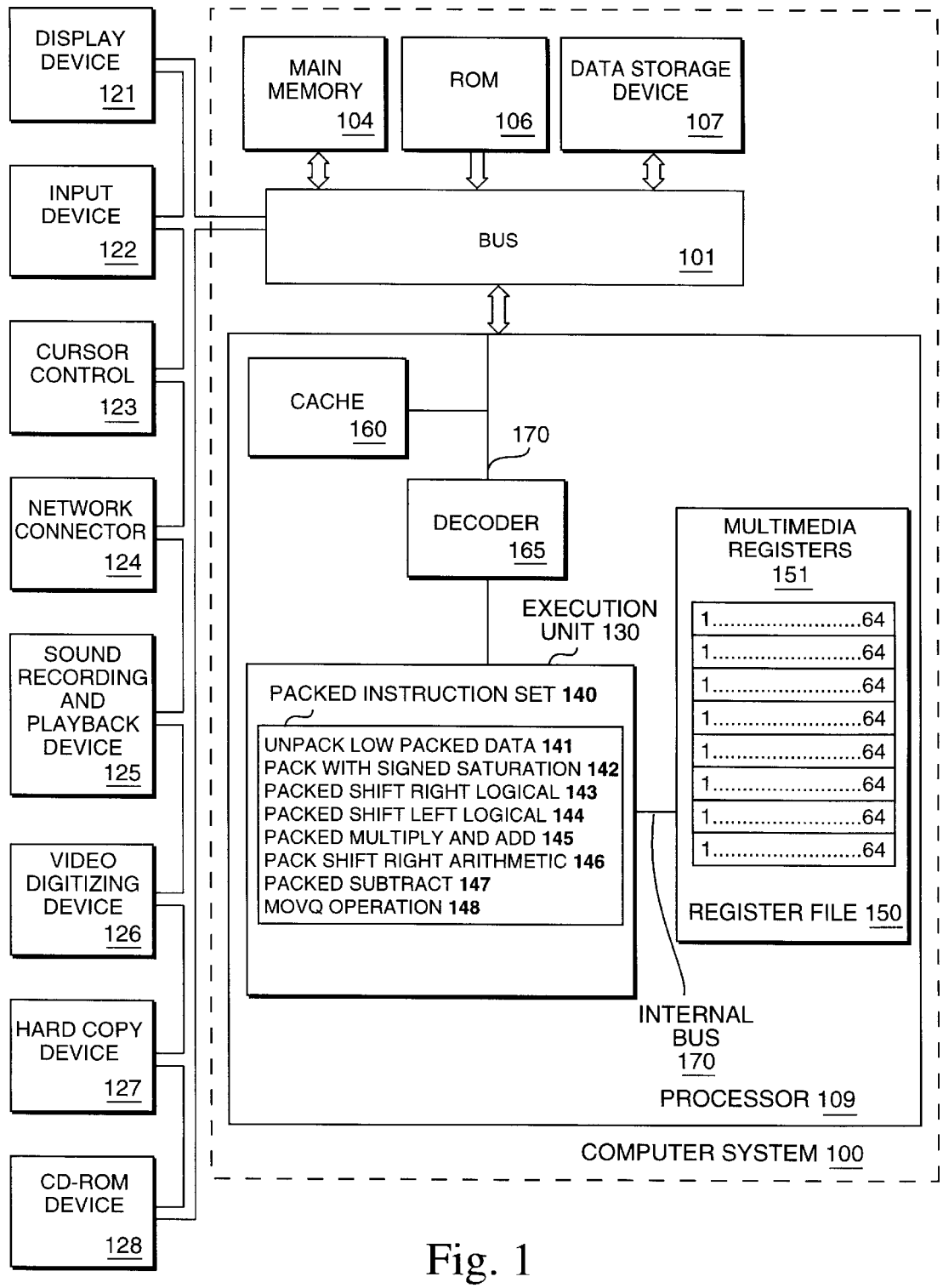
FIG. 1 illustrates a computer system capable of implementing one embodiment of the present invention.

FIG. 1 shows a computer system 100 upon which one embodiment of the present invention could be implemented. Computer system 100 comprises a bus 101 for communicating information, processor 109 coupled to bus 101 for processing information, and memory subsystem 104 coupled to bus 101 for storing information and instructions for processor 109.

Processor 109 includes an execution unit 130, a register file 150, a cache memory 160, a decoder 165, and an internal bus 170. Cache memory 160, storing frequently and/or recently used information for processor 109, is coupled to execution unit 130. Register file 150 stores information in processor 109 and is coupled to execution unit 130 via internal bus 170. In one embodiment of the invention, register file 150 includes multimedia registers 151 for storing multimedia information. In one embodiment, multimedia registers 151 each store up to sixty-four bits of packed data. Multimedia registers 151 may be dedicated multimedia registers or registers which are used for storing multimedia information and other information. In one embodiment, multimedia registers 151 store multimedia data when performing multimedia operations and store floating point data when performing floating point operations.

Execution unit 130 operates on packed data according to the instructions received by processor 109 that are included in packed instruction set 140. Execution unit 130 also operates on scalar data according to instructions implemented in general-purpose processors. Processor 109 is capable of supporting the Pentium® microprocessor instruction set and the packed instruction set 140. By including packed instruction set 140 into a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER, and MOTOROLA. Alpha™ is a trademark of Digital Equipment Corporation.)

In one embodiment, packed instruction set 140 includes instructions for executing an Unpack Low Pack data (PUNPCKL) 141, a Pack with Signed Saturation PACKSS 142, a pack shift right logical (PSRL) 143, a pack shift left logical (PSLL) 144, a packed multiply and add (PMADD) 145, a Pack Shift Right Arithmetic (PSRA) 146, a Packed Subtract (PSUB) 147, and a MOVQ operation 148.

By including packed instruction set 140 in the instruction set of general-purpose processor 109 along with associated circuitry to execute the instructions, the operations used by many existing multimedia applications may be performed using packed data in a general-purpose processor. Thus, many multimedia applications may be executed more efficiently by using the full width of a processor's data bus for performing operations on packed data. This eliminates the need to transfer smaller units of data across the processor's data bus to perform one or more operations one data element at a time.

Still referring to FIG. 1, the computer system 100 of the present invention includes a display device 121 such as a monitor. The display device 121 may include an intermediate device such as a frame buffer. The computer system 100 includes an input device 122 such as a keyboard, and a cursor control 123 such as a mouse, or trackball, or trackpad. The display device 121, the input device 122, and the cursor control 123 are coupled to bus 101. Computer system 100 may also include a network connector 124 such that computer system 100 is part of a local area network (LAN) or a wide area network (WAN). Additionally, computer system 100 can be coupled to a device for sound recording, and/or playback 125, such as an audio digitizer coupled to a microphone for recording voice input for speech recognition. Computer system 100 may also include a video digitizing device 126 that can be used to capture video images, a hard copy device 127 such as a printer, and a CD-ROM device 128. The devices 124–128 are also coupled to bus 101.

Data and Storage Formats

Figure 2:
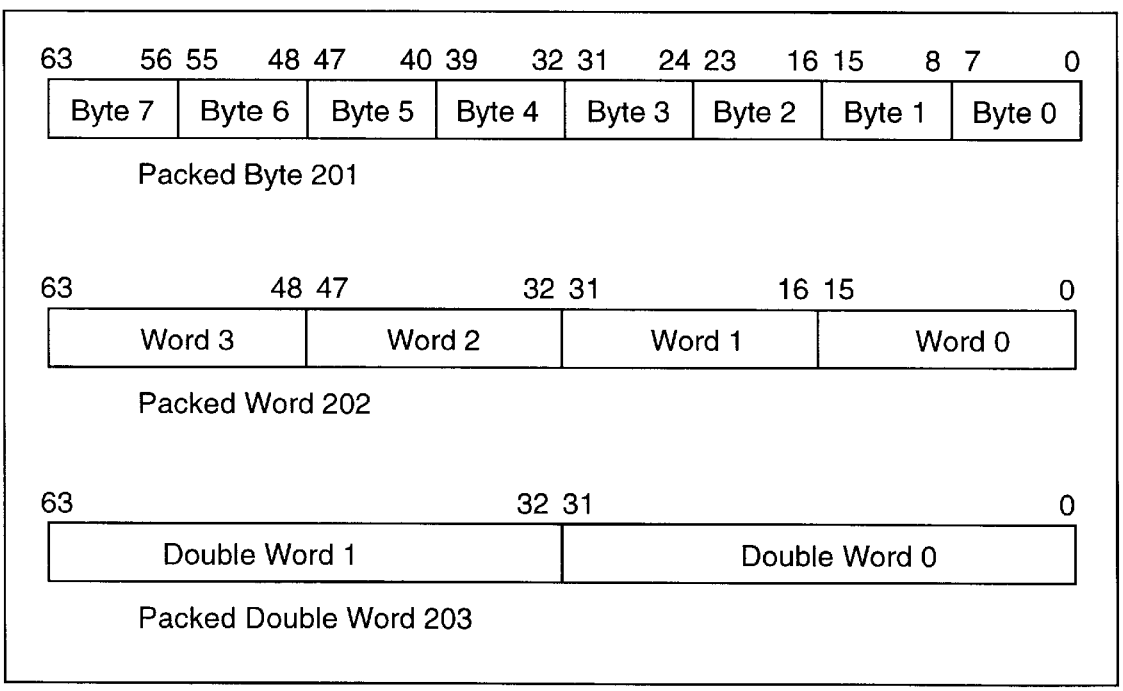
FIG. 2 illustrates packed data-types according to one embodiment of the invention.

FIG. 2 illustrates three packed data-types: packed byte 201, packed word 202, and packed doubleword (dword) 203. Packed byte 201 is sixty-four bits long containing eight packed byte data elements. Generally, a data element is an individual piece of data that is stored in a single register (or memory location) with other data elements of the same length. In packed data sequences, the number of data elements stored in a register is sixty-four bits divided by the length in bits of a data element. Packed word 202 is sixty-four bits long and contains four packed word data elements. Each packed word contains sixteen bits of information. Packed doubleword 203 is sixty-four bits long and contains two packed doubleword data elements. Each packed doubleword data element contains thirty-two bits of information.

FIG. 3a through 3c illustrate the in-register packed data storage representation according to one embodiment of the invention. Unsigned packed byte in-register representation 310 illustrates the storage of an unsigned packed byte 201 in one of the multimedia registers 151. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 311 illustrates the storage of a signed packed byte 201. Note that the eighth bit of every byte data element is the sign indicator.

Unsigned packed word in-register representation 312 illustrates how word three through word zero are stored in a register of multimedia registers 151. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 313 is similar to the unsigned packed word in-register representation 312. Note that the sixteenth bit of each word data element is the sign indicator.

Unsigned packed doubleword in-register representation 314 shows how multi-media registers 151 store two double-word data elements. Doubleword zero is stored in bit thirty-one through bit zero of the register. Doubleword one is stored in bit sixty-three through bit thirty-two of the register. Signed packed doubleword in-register representation 315 is similar to unsigned packed doubleword in-register representation 314. Note that the necessary sign bit is the thirty-second bit of the doubleword data element.

Packed Data Instructions of the Invention

Referring now to FIGS. 4–10 the instructions of packed instruction set 140 are described in more detail. In each example described below, the operands are packed data located in multimedia registers 151. Alternate embodiments may access the operands and/or the results directly from memory 104. In other embodiments, these registers can be stored in a general purpose register file.

Figure 4:
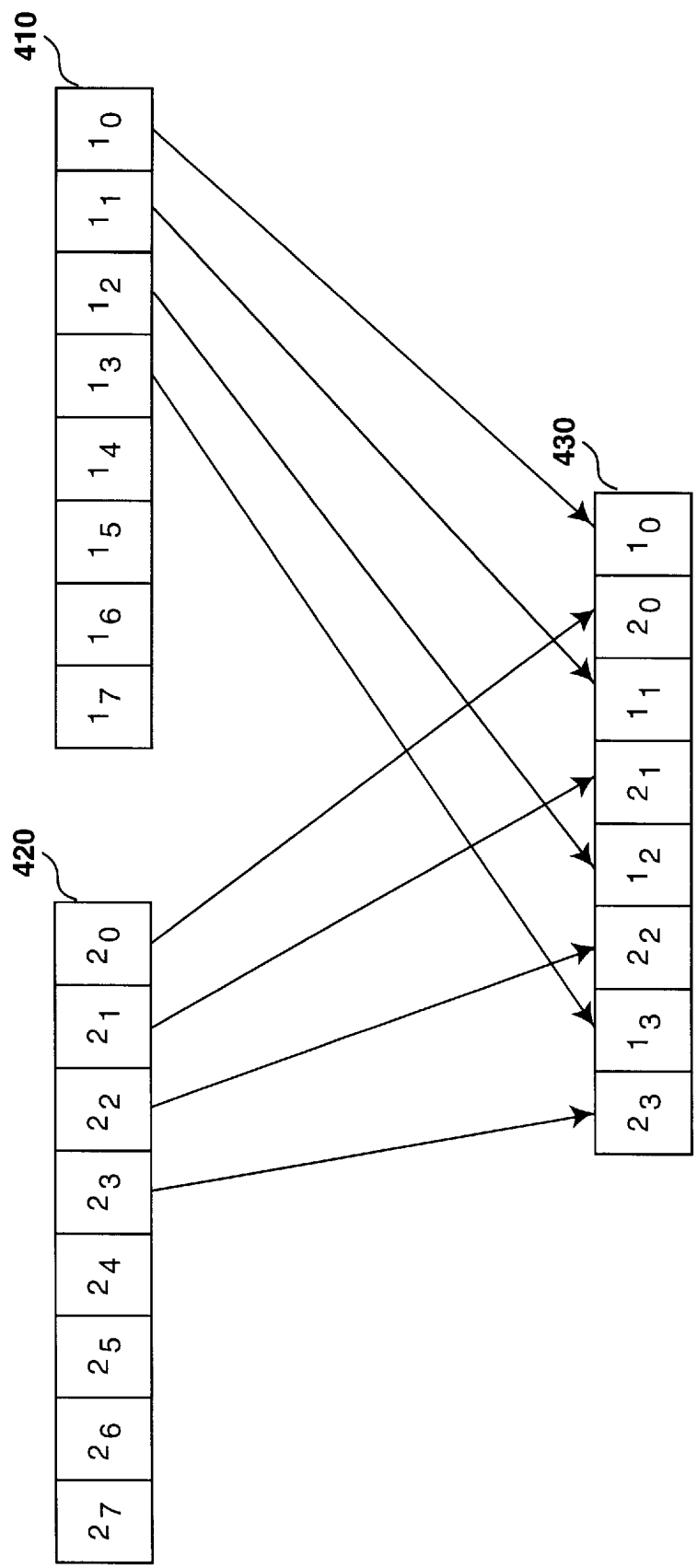
FIG. 4 illustrates the unpack low Packed data operation used in one embodiment in the method of the present invention.

FIG. 4 illustrates an example of the PUNPCKL 142 instruction. The instruction interleaves the low-order data elements of packed data sequences 410 and 420. The PUNPCKL 142 instruction is codified as PUNPCKLBW, PUNPCKLWD, and PUNPCKLDQ when interleaving bytes, words, and double-words, respectively. When source data comes from 64-bit registers, the high order bytes, words or double-word are ignored. When unpacking from a memory operand, only 32 bits are accessed and all are utilized by the instruction. By choosing a packed data sequence to be filled with zeros, an unpacking of byte elements into word elements or word elements into double-word elements, is performed. FIG. 4 illustrates the PUNPCKL operation performed for the packed-bytes data elements.

Figure 5:
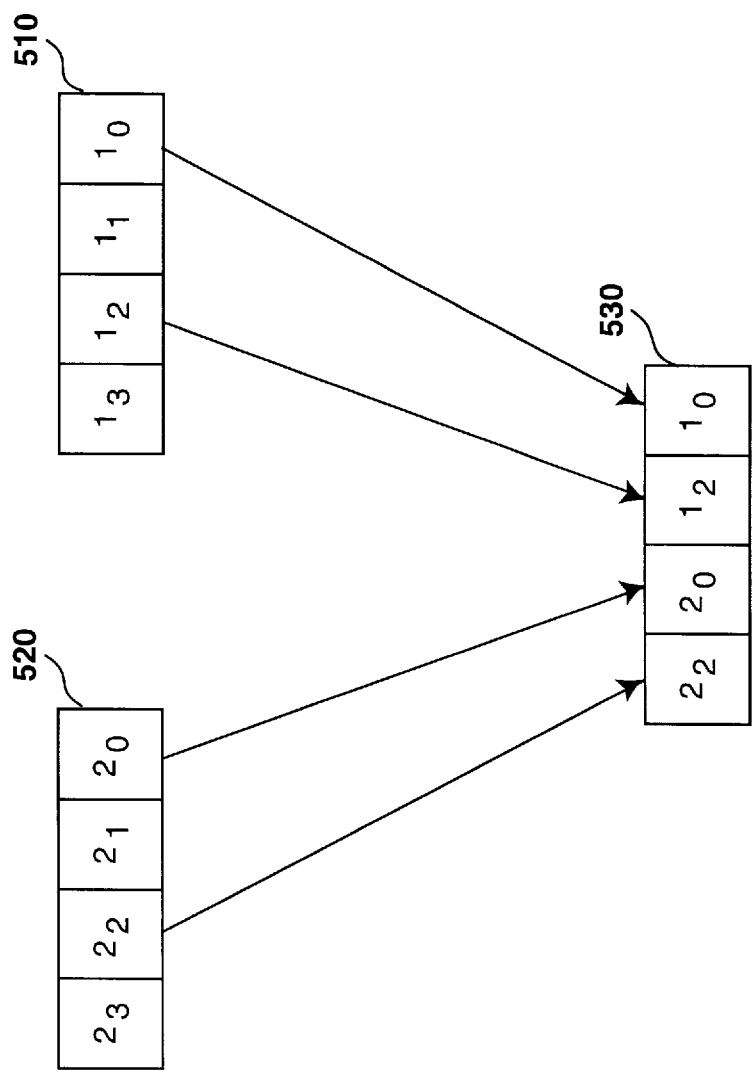
FIG.5 illustrates the pack with signed saturation operation used in one embodiment n the method of the present invention.

FIG. 5 illustrates the PACKSS 142 instruction. The instruction converts from signed packed words (or dwords) into signed packed bytes (or words) by packing the low-order bytes (or words) of the signed word (or dword) elements from registers 510 and 520 into the respective signed bytes (or words) of register 510. When the PACKSS 142 instruction is converting dwords into packed words, it is represented as PACKSSDW. When the PACKSS 142 instruction is converting words into packed bytes it is represented as PACKSSWB.

If the signed values in the word elements of register 510 and 520 are smaller than 0×80 (or 0×8000 for dwords) the result elements stored to register 510 are clamped to 0×80 (or 0×8000)). If the signed values in the word elements of register 510 and 520 are larger than 0×7f (or 0×7fff for dwords) the result elements stored to register 510 are clamped to 0×7f (or 0×7fff).

Figure 6:
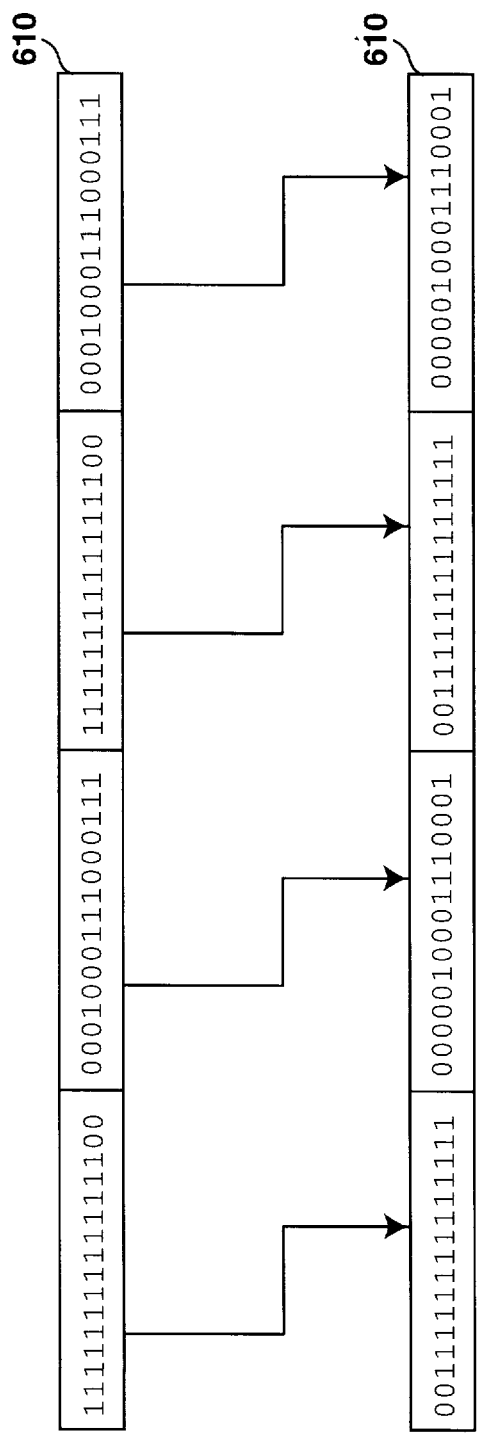
FIG. 6 illustrates the packed shift right logical operation used in one embodiment in the method of the present invention.

FIG. 6 illustrates the PSRL 143 instruction. The instruction independently shifts each data element of packed data sequence 610 to the right by the scalar shift count. In order to shift each individual packed word, double-word, or the entire packed data sequence, by the shift count, the PSRL 143 instruction is codified as PSRLW, PSRLD, or PSRLQ, respectively. The high-order bits of each element are filled with zero. The shift count is interpreted as unsigned. Shift counts greater than 15 (for words) 31 (for doublewords) or 63 (otherwise) yield all zeros.

The PSLL 144 instruction is performed in the same manner as the PSRL 143 instruction. In the PSLL 144 instruction, each data element is independently shifted to the left by scalar shift count. Moreover, the lower order bits of each element are filled with zeros. In order to shift each individual packed word, or double-word, by the shift count, the PSLL 141 instruction is codified as PSLLW and PSLLD, respectively.

Figure 7:
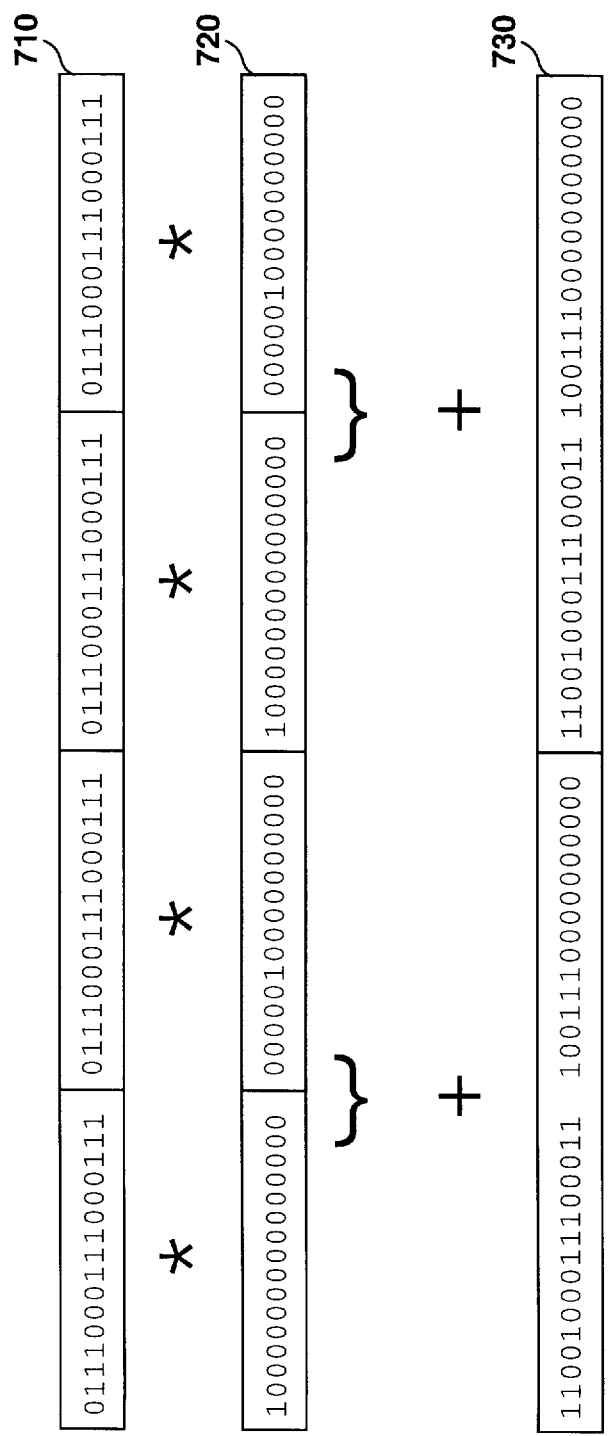
FIG. 7 illustrates the packed multiply and add operation used in one embodiment in the method of the present invention.

FIG. 7 illustrates the PMADD 145 operation. In the PMADD 145 operation, the signed data elements of packed data sequence 710 are multiplied with the corresponding signed data elements of the packed data sequence 720. The 32-bit intermediate results are summed by pairs producing two 32-bit integers. In cases which overflow, the results are truncated. These two integers are packed into the corresponding elements of packed data sequence 730.

Figure 8:
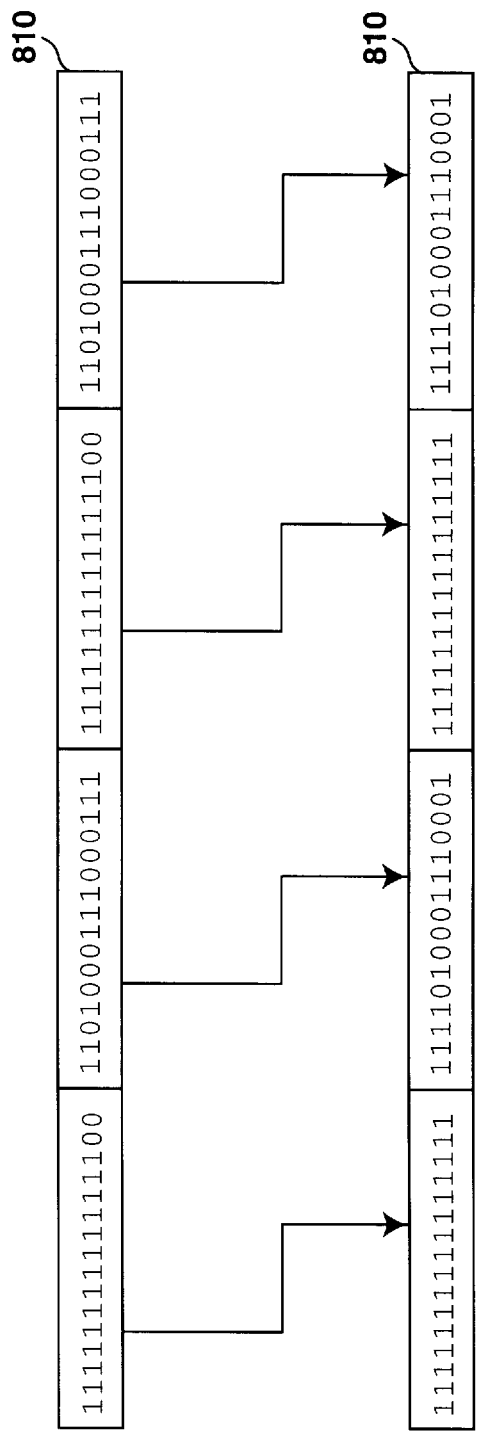
FIG. 8 illustrates the pack shift right arithmetic operation used in one embodiment in the method of the present invention.

FIG. 8 illustrates the PSRA 146 operation. In the PSRA 145 operation, the signed data elements of register 810 are each independently shifted to the right by the scalar shift count in register 820. The high-order bits of each element are filled with the initial value of the sign bits of the data elements in register 810. The shift count is interpreted as unsigned. Shift counts greater than 15 (for words) or 31 (for dwords) yield all ones or zeros depending on the initial value of the sign bit of the elements in register 810. The result elements are written to the respective elements of register 810.

Figure 9:
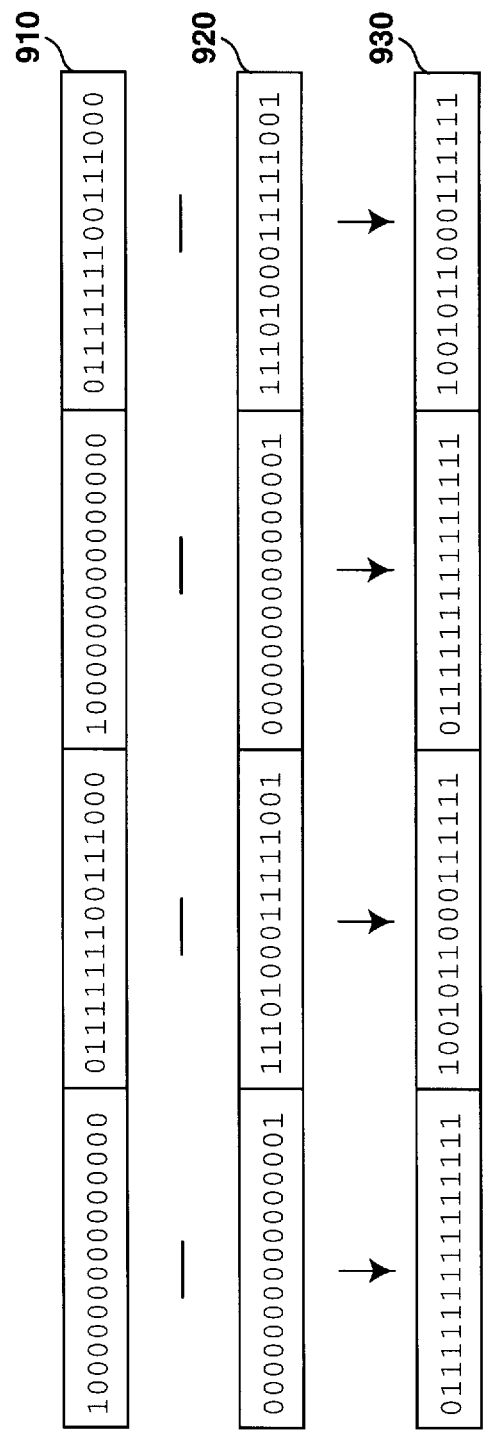
FIG. 9 illustrates the packed subtract operation used in one embodiment in method of the present invention.

FIG. 9 illustrates the PSUB 147 operation. In the PSUB 146 operation, the signed or unsigned data elements of register 920 are subtracted from the respective signed or unsigned data elements of register 920. The results are placed in the respective data elements of register 910. If a result element can not be represented in an element of register 910, due to overflow or underflow, the lower 8 bits (for bytes) 16 bits (for packed words) or 32 bits (for packed double-words) of the result element are written to register 910.

Figure 10:
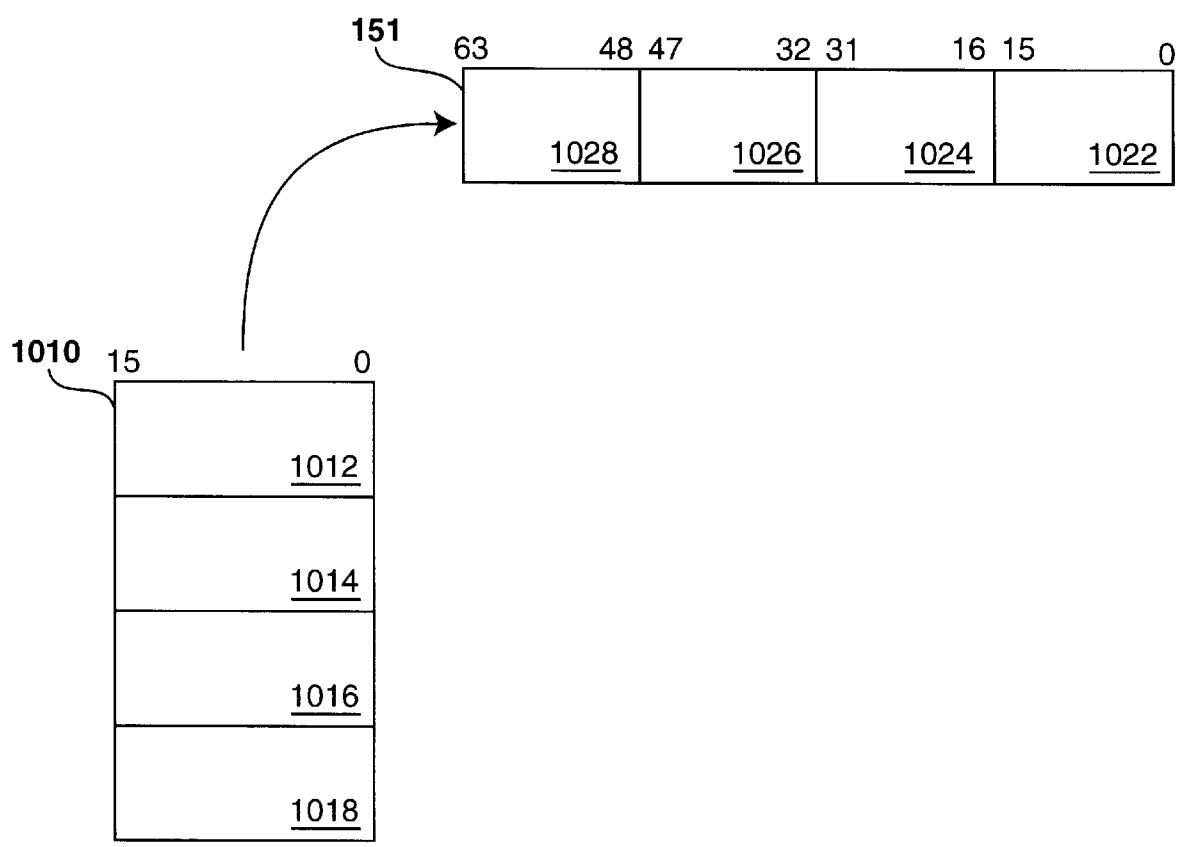
FIG. 10 illustrates the MOVQ operation used in one embodiment in the method of the present invention.

FIG. 10 illustrates an example of the MOVQ 148 instruction. The MOVQ 148 instruction is used to transfer sixty-four data bits, four packed words, to and from the multimedia registers 151. As shown in FIG. 10, packed data 1010, having packed words 1012, 1014, 1016, and 1018 located in memory are transferred to a register of multimedia registers 151, and stored as data elements 1022, 1024, 1026, and 1028, respectively.

Method of Performing Division Emulation

Figure 11A:
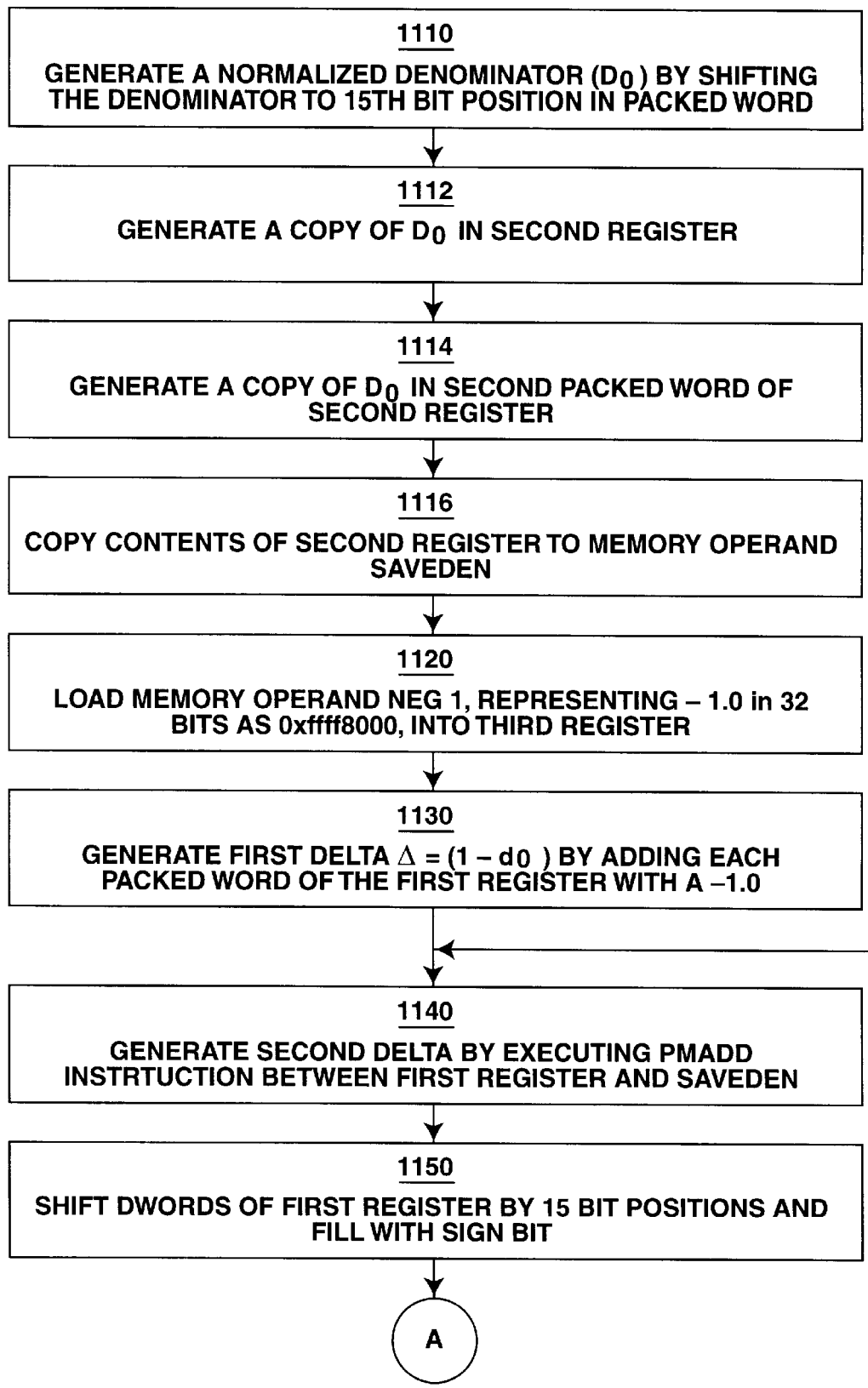
FIGS. 11a–11c illustrate a block diagram of the steps used in one embodiment of the method of the present invention.
Figure 11B:
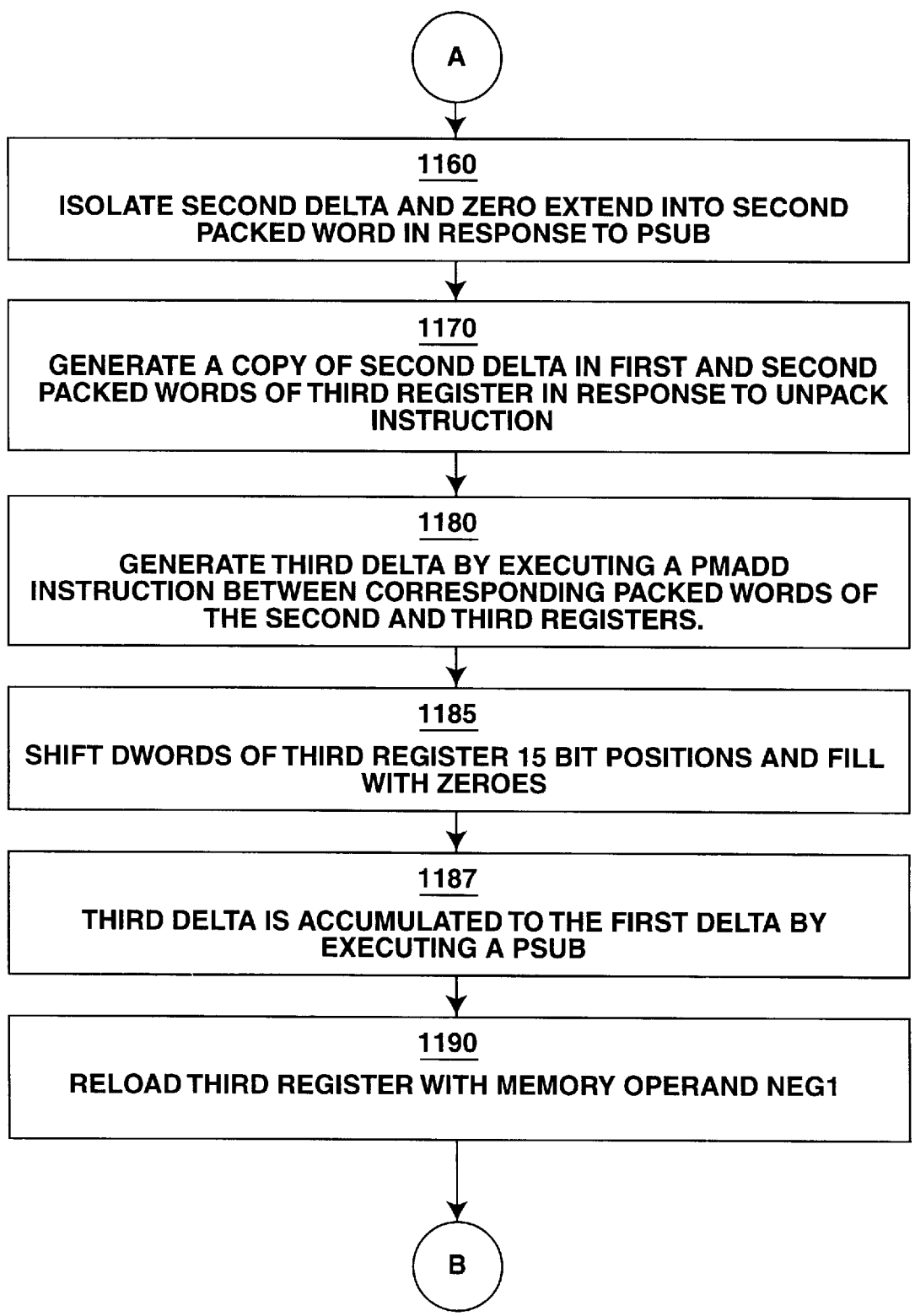
Figure 11C:
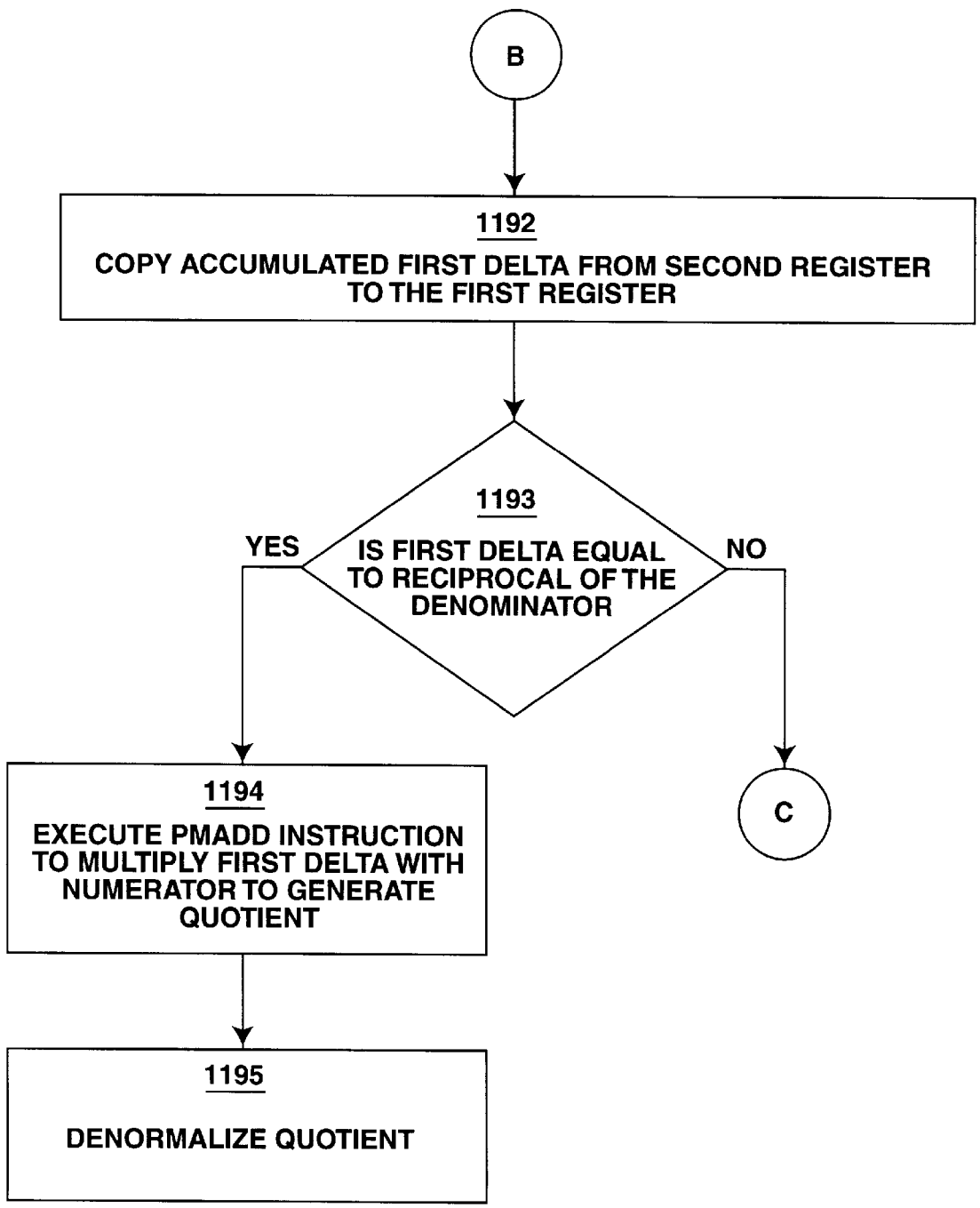

The steps for one embodiment of the present invention are illustrated in block diagrams FIGS. 11*a*–11*c*, and further illustrated as in-register representations in FIGS. 12*a*–12*h*. As described herein, the steps for performing division emulation are performed to manipulate one denominator in the low dword of a packed data sequence. As will be apparent, a second denominator in the high dword of the same packed data sequence could be processed simultaneously in response to the same instructions.

In processing block 1110, the denominator (d) is normalized ($d_0$) by left justifying the denominator to the 15th bit in a packed word, leaving the MSB as the sign bit. This procedure is done simply by multiplying the denominator by $2^n$, wherein n represents the number of bit positions originally between the MSB of the denominator and the 15th bit position. The $d_o$ is originally stored in a first packed word of register 1210. The second packed word of register 1210 is zero extended. $d_0$ also represents $1.0-\Delta_0$. A copy of the $d_0$, in processing block 1112, is then generated in response to a MOVQ instruction, which places the copy in register 1220.

In processing block 1114, a copy of $d_0$ is then placed in the second packed word of register 1220 by executing a PUNPCKLWD with register 1220. A memory operand (saveden), in processing block 1116, is generated by copying the packed sequence of register 1220.

In processing block 1120, a memory operand Neg1, representing 0xffff8000, is loaded into register 1230 in response to execution of a MOVQ instruction, which represents a negative one in the first packed word sign extended through the second packed word.

Figure 12A:
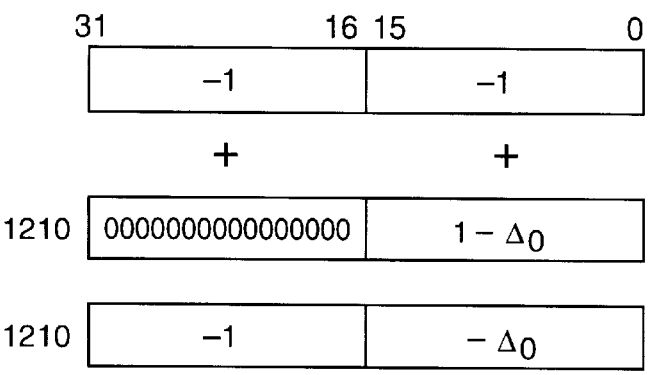
FIGS. 12a–12h illustrate in-register packed data representations of the steps used in one embodiment in the method of the present invention.

In processing block 1130, a first delta ($\Delta_0$) is generated by adding the corresponding packed words of register 1210 and a value 0x80008000 representing a negative one in two adjacent packed words, in response to execution of to a PADDWD, as illustrated in FIG. 12*a*. $\Delta_0$ in effect represents difference between 1.0 and $d_0$.

Figure 12B:
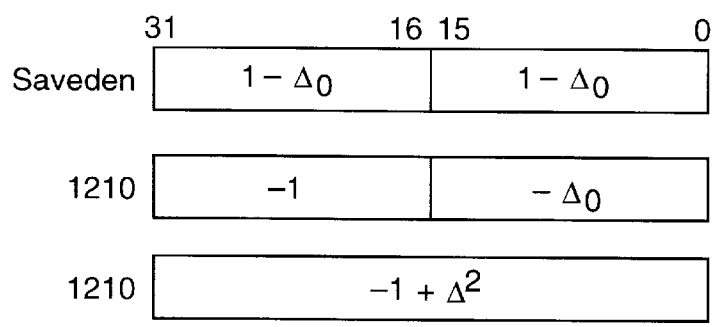

A loop begins with processing block 1140, wherein a second delta is generated. Specifically, in response to a PMADD instruction, the corresponding packed words of the memory operand Saveden and register 1210 are multiplied. The resultant 32-bit products are then added and stored as one dword in register 1210, as illustrated in FIG. 12*b*.

As performed, block 1140 generates a binomial operation in response to the execution of one instruction. More specifically, as illustrated in FIG. 12*b*, Saveden essentially represents ($1-\Delta_0$) in each low packed word. Register 1210 has stored ($-\Delta_0$) in the first packed word and ($-1$) in the second packed word. The multiplication step generates a ($-\Delta+\Delta^2$) in a first packed word, and a ($-1+\Delta$) in a second packed word, which are then added to generate one dword representing ($\Delta 1+\Delta^2$). This procedure is accumulated through the incremental loops of the method. Moreover, the second delta polynomial in effect represents the first delta polynomial doubled.

Figure 12C:
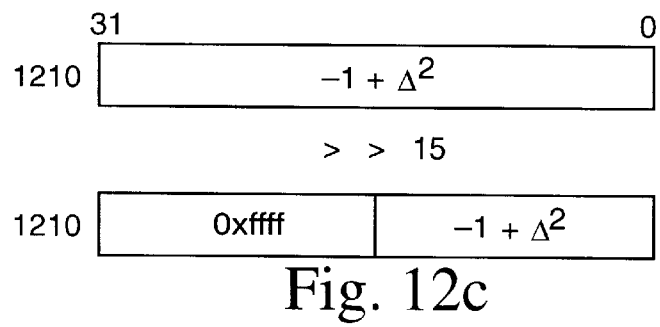

In processing block 1150, the dwords of register 1210 are right shifted by 15 bit positions in response to execution of a PSRA instruction. As illustrated in FIG. 12*c*, the second packed word represents [0xffff] and the first packed word represents ($-1+\Delta^2$).

Figure 12D:
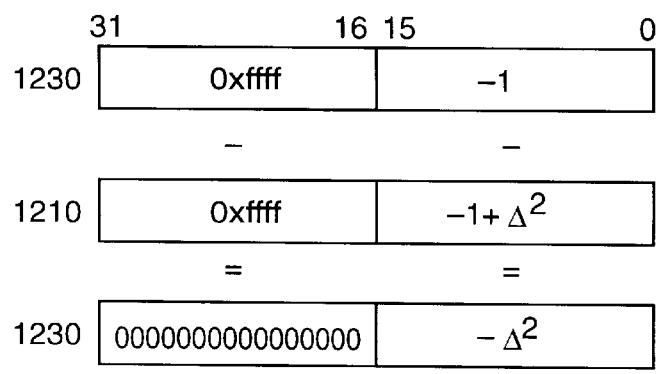

In processing block 1160, the dwords of register 1210 are subtracted from the corresponding dwords of register 1230, in response to a PSUBD. The difference is stored in register 1230, as illustrated in FIG. 12*d*. This step in effect zero extends the data in the second packed word and isolates the second delta in the first packed word.

Figure 12E:
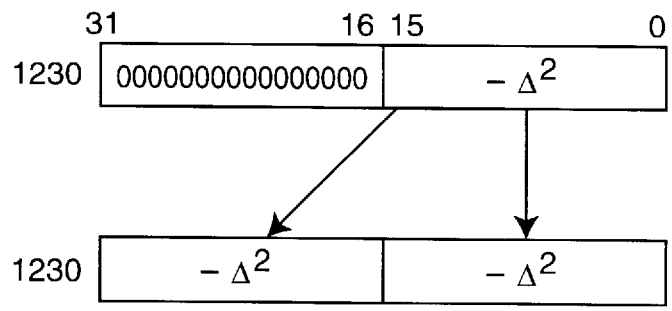

Processing block 1170 generates a copy of the second delta for the second packed word of register 1230. A PUNPCKLWD is executed with only register 1230, thereby generating a copy of the second delta in the first and second packed words of register 1230, as illustrated in FIG. 12*e*. Note, that when processing two denominators in parallel, a PACKADW would be executed prior to the PUNPCKLWD.

Figure 12F:
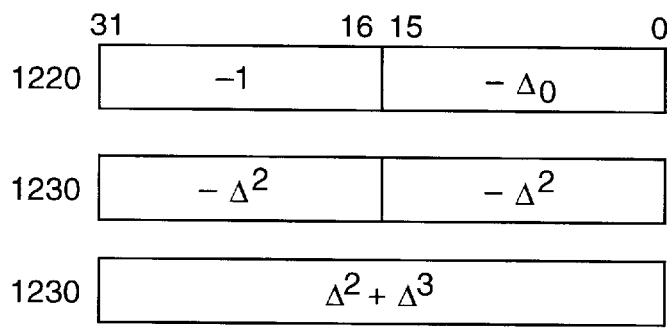

In processing block 1180, a third delta is generated by executing a PMADD instruction between corresponding packed words of registers 1220 and 1230, storing the results in register 1230, as illustrated in FIG. 12*f*. The third delta, in effect, represents the present first delta multiplied with the present second delta, wherein the powers of each delta would be added.

Figure 12G:
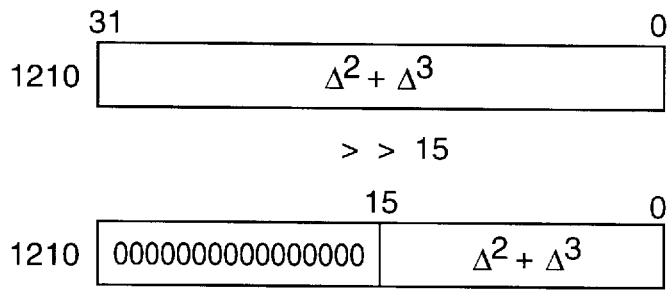

In processing block 1185, the dwords of register 1230 are right shifted by 15 bit positions in response to execution of a PSRLD instruction. As illustrated in FIG. 12*g*, the second packed word represents [0x0000] and the first packed word represents ($\Delta^2+\Delta^3$).

Figure 12H:
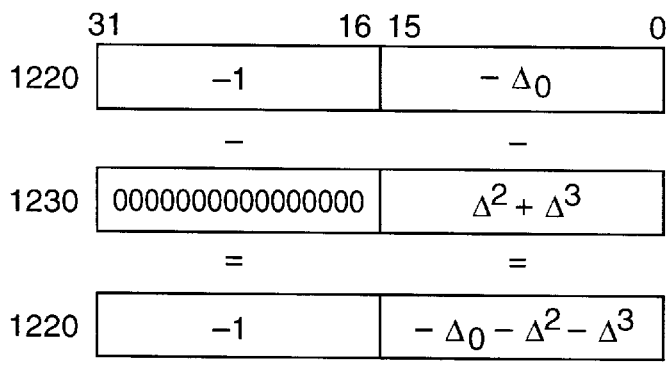

In processing block 1187, the third delta is accumulated into the value of the first delta. In response to a PSUBW, the dwords of register 1230 are subtracted from the corresponding dwords of register 1220, with the difference stored in register 1220, as illustrated in FIG. 12*h*. The value stored in the first packed word of register 1220 represents the value of the third delta subtracted from the present value of the first delta. Recall that the packed words of 1220 include ($1-d_0$), which also represents $\Delta_0$.

Processing block 1190 reloads register 1230 with the memory operand Neg1, representing 0xffff8000, in response to execution of a MOVQ instruction. In processing block 1192, a copy of the accumulated first delta is made to register 1210 in response to a MOVQ instruction. The copy is presented to register 1210 so that in processing block 1140 the second delta can be regenerated, which in effect represents the degree of the first delta polynomial (e.g. $\Delta^2-\Delta^3$) incremented by one (e.g. $\Delta^4$).

Processing blocks 1140 through 1192 are continued until the first delta is equal to the reciprocal of the denominator. In other words, the first delta is continuously made smaller until its value represents the denominator's reciprocal. Once this is achieved, the first delta is multiplied with the numerator to generate the target quotient, as explained in the BACKGROUND OF THE INVENTION. Moreover, trials have shown that repeating processing blocks 1140 through 1192 four times consistently generates the reciprocal value.

In conditional block 1193, if processing blocks 1140 through 1192 have been processed four times or the first delta equals the reciprocal of the denominator, the method proceeds to processing block 1194, otherwise the method loops back to block 1140. Processing block 1194 generates the target quotient. Processing block 1194 involves executing a PMADD instruction, wherein packed words in register 1240 representing numerators are multiplied with the corresponding packed words of register 1220 which represent the reciprocal of the respective denominators. As explained in the BACKGROUND OF THE INVENTION, multiplying the reciprocal of the denominator with the numerator generates the quotient without having to do any division. In a final step of processing block 1195, the generated quotient is denormalized. The dwords of register 1240 are each right shifted 15 bit positions in response to a PSRAD.

From the above description, it will be apparent that the invention disclosed herein provides a novel and advantageous computer implemented method of performing division emulation. As will be understood by those familiar with the art, the invention may be embodied in other specific forms without departing from its essential features, and thus, the described embodiments are not restrictive of the scope of the invention. The following claims are indicative of the scope of the invention, and all variations which come within the meaning and range of equivalency of the claims are to be embraced within their scope.

What is claimed is:

1. A computer implemented method for generating a quotient, said method exclusive of division operations, said method comprising the steps of:
    a) generating, in response to a first instruction, a first delta by performing an operation between a denominator and a first value;
    b) generating, in response to a second instruction, a second delta by performing an operation between said denominator and said first delta;
    c) generating, in response to said second instruction, a third delta by performing an operation between said second delta and said denominator;
    d) joining, in response to a third instruction, said third delta to said first delta;
    e) repeating steps b) through d) until said first delta is equal to a predetermined value; and
    f) generating said quotient, in response to a fourth instruction, by performing an operation between said first delta and a numerator.

2. The method of claim 1, wherein step e) further includes repeating steps b) through d) until said first delta is equal to a reciprocal of said denominator.

3. The method of claim 2, wherein steps b) and c) perform binomial multiplication operations in response to execution of said second instruction.

4. The method of claim 3, wherein said method is performed with said denominator, said deltas, and said numerator in respective packed data sequences.

5. The method of claim 4, wherein prior to step a) of claim 1, the method includes the step of:
    a) normalizing said denominator, wherein said denominator is left justified to a predetermined bit position in a signed packed word.

6. The method of claim 5 wherein step e) further includes repeating steps b) through d) four times.

7. The method of claim 6, wherein said method generates 2 quotient values and packed data sequences of said denominator and said numerator each represent two separate numerators and denominators, respectively.

8. The method of claim 7, wherein data elements of said numerator value represent data values representing multimedia parameters.

9. The method of claim 8, wherein said data elements of said numerator value represent data values representing a location in an image input.

10. The method of claim 9, wherein each data element of said numerator value is associated with a different X or Y coordinate value from a corresponding array of pixels of said image input.

11. The method of claim 10, wherein data elements of said denominator value each represent visual distance values in reproducing said image input.

12. The method of claim 11, wherein data elements of said denominator value each represent visual distance values in reproducing a three-dimensional texture mapping of said image input.

13. A computer implemented method of generating a quotient using packed data sequences, said method exclusive of division operations, said method comprising the steps of:
    a) normalizing a denominator, wherein said denominator is left justified to a predetermined bit position in a signed packed word;
    b) generating, in response to execution of a MOVQ instruction, a copy of said denominator;
    c) loading, in response to execution of a MOVQ instruction, a first memory operand as a dword, said first memory operand representing a negative one;
    d) generating, in response to execution of a PADDWD instruction, a first delta by performing an operation between said denominator and a first value;
    e) generating, in response to execution of a PMADD instruction, a second delta by performing an operation between said denominator and said first delta;
    f) shifting said second delta right by 15 bit positions, in response to execution of a PSRA instruction;
    g) isolating said second delta, in response to execution of a PSUBD instruction, wherein a difference is generated between data elements said second delta and data elements of said first memory operand;
    h) unpacking said second delta, in response to execution of a PUNPCKLWD instruction, wherein said second delta is copied from a packed word into two adjacent packed words of a packed data sequence;
    i) generating, in response to execution of said PMADD instruction, a third delta by performing an operation between said packed data sequence having said second delta and a packed data sequence having said denominator;
    j) shifting said third delta right by 15 bit positions, in response to execution of a PSRLD instruction;
    k) joining, in response to execution of a PSUBW instruction, said third delta to said first delta;
    l) repeating steps e) through k) four times; and
    m) generating said quotient, in response to said PMADD instruction, by performing an operation between said first delta and a numerator.

14. A machine-readable medium having stored thereon data representing sequences of instructions for performing a division emulation sequence, said sequence of instruction which, when executed by a processor, cause said processor to perform the steps of:
    a) generating, in response to a first instruction, a first delta by performing an operation between a denominator and a first value;
    b) generating, in response to a second instruction, a second delta by performing an operation between said denominator and said first delta;
    c) generating, in response to said second instruction, a third delta by performing an operation between said second delta and said denominator;
    d) joining, in response to a third instruction, said third delta to said first delta;
    e) repeating steps b) through d) until said first delta is equal to a predetermined value; and
    f) generating said quotient, in response to a fourth instruction, by performing an operation between said first delta and a numerator.

15. The machine-readable medium of claim 14, wherein step e) further includes repeating steps b) through d) until said first delta is equal to a reciprocal of said denominator.

16. The machine-readable medium of claim 15, wherein steps b) and c) perform binomial multiplication operations in response to execution of said second instruction.

17. The machine-readable medium of 16, wherein said method is performed with said denominator, said deltas, and said numerator in respective packed data sequences.

18. The machine-readable medium of claim 17, wherein prior to step a) of claim 14, the method includes the step of:

a) normalizing said denominator, wherein said denominator is left justified to a predetermined bit position in a signed packed word.

19. The machine-readable medium of claim 18 wherein step e) further includes repeating steps b) through d) four times.

20. The machine-readable medium of claim 19, wherein said method generates 2 quotient values and packed data sequences of said denominator and said numerator each represent two separate numerators and denominators, respectively.

21. The machine-readable medium of claim 20, wherein data elements of said numerator value represent data values representing multimedia parameters.

22. The machine-readable medium of claim 21, wherein said data elements of said numerator value represent data values representing a location in an image input.

23. The machine-readable medium of claim 22, wherein each data element of said numerator value is associated with a different X or Y coordinate value from a corresponding array of pixels of said image input.

24. The machine-readable medium of claim 23, wherein data elements of said denominator value each represent visual distance values in reproducing said image input.

25. The machine-readable medium of claim 24, wherein data elements of said denominator value each represent visual distance values in reproducing a three-dimensional texture mapping of said image input.

\* \* \* \* \*

UNITED STATES PATENT AND TRADEMARK OFFICE
CERTIFICATE OF CORRECTION

PATENT NO.    : 5,831,885
DATED         : November 3, 1998
INVENTOR(S)   : Mennemeier It is certified that error appears in the above-identified patent and that said Letters Patent is hereby corrected as shown below:

Column 3,
Line 5, delete "n" and insert -- in --.
Line 18, after "in", insert -- the --.

Signed and Sealed this

Seventeenth Day of June, 2003

JAMES E. ROGAN
*Director of the United States Patent and Trademark Office*